J. W. HARTLEY.
CLEVIS.
APPLICATION FILED SEPT. 21, 1914.
1,138,867.
Patented May 11, 1915.
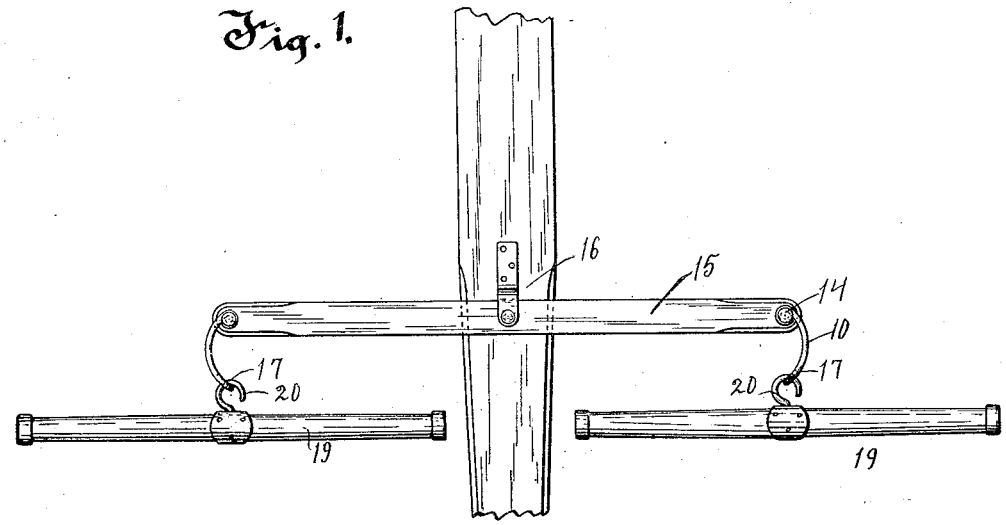
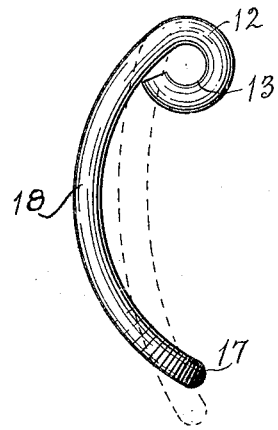
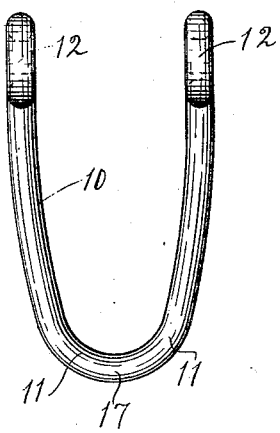
WITNESSES
C. F. Miller.
Emily Schowalter.
INVENTOR
John W. Hartley
Morsell, Keeney & French
ATTORNEYS.

UNITED STATES PATENT OFFICE.

JOHN W. HARTLEY, OF NASHOTAH, WISCONSIN.

CLEVIS.

1,138,867. Specification of Letters Patent. Patented May 11, 1915.

Application filed September 21, 1914. Serial No. 862,719.

*To all whom it may concern:*

Be it known that I, JOHN W. HARTLEY, a citizen of the United States, and resident of Nashotah, in the county of Waukesha and State of Wisconsin, have invented new and useful Improvements in Clevises, of which the following is a description, reference being had to the accompanying drawings, which are a part of this specification.

The invention relates to clevises.

The invention designs more particularly to provide a clevis which, in and of itself, relieves the member or bodies to which it is connected, from undue shock occasioned by the initial pull in starting a load.

The invention further designs to produce a clevis which is adapted to be pivotally connected to a load, to be pulled or raised, and which is curved outwardly from its pivotal connection, and is connected at its outwardly-curved end by suitable means to the draft animal or other source of power, which construction results in a clevis which will relieve both the member to which it is connected, and the animal or source of power, from the initial shock occasioned by the pull on the load, due to its curved shape, as the initial shock will be taken care of by the spring of the clevis itself.

The invention designs to produce a new and improved form of clevis.

In the drawings, Figure 1 is a view of the clevis embodying the invention, showing it connected up to a double-tree of a vehicle; Fig. 2 is a plan view of the clevis; Fig. 3 is an elevation of the clevis.

The clevis consists of a substantially U-shaped member 10 preferably of spring metal, whose transverse portion is curved as shown at 11 in Fig. 2, and whose extremities 12 are bent over upon themselves, to provide an eyelet 13 through which a bolt such as 14 may be inserted, to pivotally connect the clevis to a member of the load to be pulled. In this instance, Fig. 1 shows the clevis pivotally connected by the bolt 14 to the double-tree 15 which is secured on the wagon pole 16, though it will be apparent that the clevis may be used on swingletrees of vehicles, on agricultural implements, and on other constructions where its use may be applicable in connection with the drawing of a load.

The U-shaped clevis is curved outwardly and away from the center of draft, as shown at 18 in Fig. 2, and when the clevis is in use, as shown in Fig. 1, where the swingletrees 19 are pivotally connected to the ends 17 of the clevises by the hook members 20, the initial shock occasioned by the pull of the animals upon the swingletrees 19, will be overcome by the resiliency of the clevis itself, there being a tendency of the parallel members of the clevis to straighten out or move inwardly toward the center of draft on the initial application of the pulling force, which will result in relieving both the animal and the bolts from this shock. In other words, the clevis itself not only accomplishes its ordinary functions, but provides a resilient connection between the load and the animal or other source of power. It will also be noted that the clevis need not necessarily be limited to its use in connection with a draft animal, but might be equally well employed in connection with any suitable power, to draw the load, and will relieve the members to which it is connected, of initial shock.

The invention thus exemplifies a clevis which, in and of itself, is adapted to relieve the two members to which it is connected, of the shock occasioned by the initial pull of one of these members upon the other.

The invention is not to be restricted to the details of construction herein set forth, but may be modified so as to be within the scope of the appended claims.

What I claim is:

1. A clevis comprising a member having spring arms, adapted to straighten under tension, connected together at one of their ends, and means at the ends of said clevis-member for connecting said clevis to a plurality of members to space said members apart and form a connection therebetween, said clevis-arms having a portion out of line with the line of draft of the clevis whereby the members to which the clevis is connected will be relieved of the initial shock occasioned by a force tending to separate these members to which the ends of the clevis are connected.

2. A clevis comprising substantially parallel extending spring arms, adapted to straighten under tension, connected together at one of their ends, which arms are curved from the line of draft of the clevis, whereby the members to which the clevis is connected will be relieved of initial shock when said members are acted upon by a force tending to separate them.

In testimony whereof, I affix my signature, in presence of two witnesses.

JOHN W. HARTLEY.

Witnesses:
H. R. NEIKEL,
PHARES PETERSON.

Copies of this patent may be obtained for five cents each, by addressing the "Commissioner of Patents, Washington, D. C."